United States Patent [19]
Walker et al.

[11] Patent Number: 6,114,474
[45] Date of Patent: Sep. 5, 2000

[54] PROCESS FOR DEACTIVATING POLYCARBONATE CATALYST RESIDUES

[75] Inventors: Theodore R. Walker, Kingsport, Tenn.; William R. Darnell, Weber City, Va.; Jean C. Fleischer, Kingsport, Tenn.

[73] Assignee: Eastman Chemical Company, Kingsport, Tenn.

[21] Appl. No.: 08/997,656

[22] Filed: Dec. 23, 1997

Related U.S. Application Data

[60] Provisional application No. 60/034,990, Dec. 28, 1996.

[51] Int. Cl.$^7$ ..................................................... C08G 64/00
[52] U.S. Cl. ........................... 525/439; 528/196; 528/198
[58] Field of Search ........................... 525/439; 528/196, 528/198

[56] References Cited

U.S. PATENT DOCUMENTS

| | | | |
|---|---|---|---|
| 2,210,817 | 8/1940 | Peterson | 528/196 |
| 2,787,632 | 4/1957 | Stevens | 528/196 |
| 2,789,968 | 4/1957 | Reynolds et al. | 528/196 |
| 3,022,272 | 2/1962 | Schnell et al. | 528/196 |
| 3,030,335 | 4/1962 | Goldberg | 528/196 |
| 3,313,777 | 4/1967 | Elam et al. | 528/176 |
| 3,317,466 | 5/1967 | Caldwell et al. | 528/176 |
| 3,335,111 | 8/1967 | Pray et al. | 528/176 |
| 3,404,122 | 10/1968 | Fritz et al. | 528/196 |
| 3,433,756 | 3/1969 | Seeliger | 528/176 |
| 3,772,405 | 11/1973 | Hamb | 528/176 |
| 3,951,903 | 4/1976 | Shaffer | 528/196 |
| 4,182,726 | 1/1980 | Illuminati et al. | 528/196 |
| 4,263,364 | 4/1981 | Seymour et al. | 528/176 |
| 4,350,805 | 9/1982 | Jackson, Jr. et al. | 528/176 |
| 4,585,854 | 4/1986 | Tung et al. | 528/176 |
| 5,171,830 | 12/1992 | Grey | 528/196 |
| 5,194,523 | 3/1993 | Small, Jr. et al. | 525/439 |
| 5,207,967 | 5/1993 | Small, Jr. et al. | 264/328.16 |
| 5,502,119 | 3/1996 | Hamilton | 525/439 |
| 5,668,202 | 9/1997 | Hirata et al. | 524/154 |

FOREIGN PATENT DOCUMENTS

| | | |
|---|---|---|
| 0 435 124 A2 | 7/1991 | European Pat. Off. . |
| 0 460 646 A2 | 12/1991 | European Pat. Off. . |
| 0 534 189 | 3/1993 | European Pat. Off. . |
| 0 738 579 | 10/1996 | European Pat. Off. . |
| 0 738 579 A2 | 10/1996 | European Pat. Off. . |
| 0 738 579 A3 | 10/1996 | European Pat. Off. . |
| 2 349 612 | 11/1977 | France . |
| 14 95 397 | 6/1969 | Germany . |
| 63-92644 | 4/1988 | Japan . |
| 64-1724 | 1/1989 | Japan . |

OTHER PUBLICATIONS

Caldwell et al., Defensive Publication T858,012, 858 O.G. 43, Jan. 7, 1969.

Gilkey et al., Defense Publication T873,016, 873 O.G. 1033, Apr. 28, 1970.

Coover et al., Defensive Publication T875,010, 875 O.G. 342, Jun. 9, 1970.

Haggin, "Catalytic Cosynthesis Method Developed," Chemical and Engineering News, pp. 25–26, May 4, 1992.

Gawlak et al., "Polycarbonates from the 2,2,4,4,–Tetramethylcyclobutane–1,3–Diols," Chemistry And Industry, pp. 1148–1149, Jun. 23, 1962.

Schnell "Chemistry And Physics of Polycarbonates, Polymer Reviews," vol. 9, Interscience Publishers (Germany), pp. 9–24, 1964.

Database WPI, Section CH, AN 95–261358 Week 9534, Jun. 27, 1995, citing JP 07 165903, Jun. 27, 1995.

Chemical Abstracts, AN 109: 171789, vol. 109, No. 20, Apr. 23, 1998, (abstract No. 171789), citing JP 63 092644, Apr. 23, 1988.

Database WPI, Section Ch, Week 9308, Class A23, AN 93–061697 (citing JP 05 009286A, Jan. 19, 1993).

Database WPI, Section Ch, Week 9209, Class AN 92–069933 (citing JP 04 015223 A, Jan. 20, 1992).

Database WPI, Section Ch, Week 9207, Class A23, AN 92–053979 (citing JP 04 001229 A, Jan. 6, 1992).

Chemical Abstracts, vol. 114, No. 4, Jan. 28, 1991, abstract No. 25305 (citing JP 02 180954 A, Jul. 13, 1990).

Patent Abstracts of Japan, vol. 010, No. 350 (C–387), Nov. 26, 1986 (citing JP 61 151263 A), Jul. 9, 1986).

US Defensive Publication T873016, Gilkey et al., Apr. 28, 1970.

*Primary Examiner*—Terressa M. Boykin
*Attorney, Agent, or Firm*—Betty J. Boshears; Harry J. Gwinnell

[57] ABSTRACT

The invention relates to a process of deactivating a polycarbonate, by mixing a polycarbonate containing an active alkali metal catalyst residue with a carboxylic acid, but not removing the deactivated catalyst. The invention further relates to a process of deactivating a polycarbonate, by mixing a solid state polycarbonate containing an active alkali metal catalyst and a carboxylic acid, followed by heating the mixture of step at a temperature to melt the mixture and deactivate the alkali metal catalyst, wherein the deactivated catalyst is not removed. The invention further relates to a process of making a polycarbonate, by polymerizing a polycarbonate in the presence of an alkali metal catalyst to produce an activated polycarbonate, and mixing the activated polycarbonate with a carboxylic acid to deactivate the alkali metal catalyst and form a polycarbonate, wherein the deactivated alkali metal catalyst is not removed from the polycarbonate. The invention further relates to products made by the processes described above. The invention further relates to polycarbonates containing an alkali metal carboxylate therein.

29 Claims, No Drawings

PROCESS FOR DEACTIVATING POLYCARBONATE CATALYST RESIDUES

CROSS REFERENCE TO RELATED APPLICATIONS

This application claims priority upon U.S. provisional application serial No. 60/034,990, filed Dec. 28, 1996, the contents of which are herein incorporated by this reference in their entirety.

FIELD OF THE INVENTION

The present invention relates to a polycarbonate, and, in particular, to a process for deactivating a polymerization catalyst used for the preparation of polycarbonates.

BACKGROUND

As an alternative to forming poly(2,2,4,4-tetramethyl-1,3-cyclobutylene carbonate) and other useful aliphatic polycarbonates using phosgene solution polymerization, basic alkali metals and their derivatives have been used as polymerization catalysts in melt and solid state polymerization processes. It has been found, however, that these aliphatic polycarbonates are somewhat thermally unstable because of residual basic alkali metal polymerization catalysts contained in the polycarbonate.

Various methods of adding acidic material to destroy the basic catalyst residues which remain in polycarbonates and cause instability have been reported in the literature. For example, U.S. Pat. No. 3,022,272 discloses that materials such as aromatic sulfonic acid, organic acid halides and chlorocarbonates, dialkyl sulfates, and acid salts of inorganic acids such as ammonium sulfate are useful "catalyst killers."

These acidic materials that have been used heretofore for this purpose have significant disadvantages. The aromatic sulfonic acids, acid halides and, to a lesser extent, the acid salts of inorganic acids, are corrosive and some, particularly the strong acids such as toluenesulfonic acid, have been found to produce undesirable color in the finished product. The dialkyl sulfates, while not so corrosive, are known to be both toxic and possibly carcinogenic so that their handling in practice is hazardous, and the presence of traces of them in the final product would present a problem for the consumer, especially if the plastic were used in food or cosmetic containers.

Another problem with many known deactivation methods is that the catalyst is not completely deactivated. Evidence of remaining active catalyst is shown in U.S. Pat. No. 3,022,272 which discloses that, after deactivation of the catalysts, the interesterification can be further continued to a limited extent in order to further increase the molecular weight of the polymer.

U.S. Pat. No. 2,210,617 discloses a process for preparing a polycarbonate in the presence of an alkali metal catalyst. After polymerization, the excess alkali metal is removed by washing with a strong acid such as hydrochloric acid. The polymerization is then completed by further heating under vacuum.

U.S. Defensive Publication T873,016 discloses removal of basic alkali metal catalyst residues from poly(2,2,4,4-tetramethyl-1,3-cyclobutylene carbonate) in the solid state or in solution. The process therein is conducted by contacting the polymer with an acidic organic compound with an ionization constant of about $2 \times 10^{-1}$ to $2.5 \times 10^{-6}$, followed by extraction either with the acid, or by dissolving the polymer in a water-immiscible solvent and extracting the solution with water.

In light of the above, it would be desirable to have a process for increasing the thermal stability of polycarbonates containing active alkali metal catalysts by completely deactivating the catalyst residue contained in the polymer. It would be especially desirable to provide a catalyst deactivation method which does not require the use of strongly acidic, corrosive, or volatile materials, nor washing or extraction of the catalyst from the polymer.

SUMMARY OF THE INVENTION

In accordance with the purpose(s) of this invention, as embodied and broadly described herein, this invention, in one aspect, relates to a process of deactivating a polycarbonate, comprising admixing a polycarbonate containing an active alkali metal catalyst residue with an effective amount of a carboxylic acid at a temperature and time sufficient to deactivate the alkali metal catalyst and form a polycarbonate having a deactivated metal catalyst.

The invention further relates to a process of deactivating a polycarbonate, comprising:
  (a) admixing
     i) a solid state polycarbonate comprising an active alkali metal catalyst; and
     ii) a carboxylic acid; and
  (b) heating the admixture of step (a) at a temperature sufficient to melt the admixture and deactivate the alkali metal catalyst to produce a polycarbonate containing a deactivated alkali metal catalyst.

The invention further relates to a process of making a polycarbonate having residual deactivated alkali metal catalyst.

The invention further relates to a process of making a polycarbonate, comprising:
  (a) polymerizing a first polycarbonate in the presence of an alkali metal catalyst to produce an activated polycarbonate; and
  (b) admixing the activated polycarbonate with an effective amount of a carboxylic acid at a temperature and time sufficient to deactivate the alkali metal catalyst and form the polycarbonate having a deactivated alkali metal catalyst.

The invention further relates to a process of deactivating polycarbonates comprising reacting a polycarbonate containing active alkali metal catalyst residue with an effective amount of a relatively weak nonvolatile carboxylic acid at a temperature and time sufficient to form a deactivated polycarbonate.

The invention further relates to a process of making polycarbonate comprising the steps of:
  (a) polymerizing polycarbonate in the presence of an alkali metal catalyst, and
  (b) reacting said polycarbonate with an effective amount of a relatively weak non-volatile carboxylic acid at a temperature and time sufficient to form deactivated polycarbonate.

The invention further relates to a polycarbonate comprising a deactivated alkali metal catalyst, wherein the deactivated metal catalyst is a salt produced by the reaction between a carboxylic acid and an alkali metal catalyst.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention may be understood more readily by reference to the following detailed description of preferred embodiments of the invention and the Examples included therein.

Before the present compositions of matter and methods are disclosed and described, it is to be understood that this invention is not limited to specific synthetic methods or to particular formulations, as such may, of course, vary. It is also to be understood that the terminology used herein is for the purpose of describing particular embodiments only and is not intended to be limiting.

In this specification and in the claims which follow, reference will be made to a number of terms which shall be defined to have the following meanings:

The singular forms "a," "an" and "the" include plural referents unless the context clearly dictates otherwise. "Optional" or "optionally" means that the subsequently described event or circumstance may or may not occur, and that the description includes instances where said event or circumstance occurs and instances where it does not.

The term "active" is used herein to describe a catalyst residue which is capable of promoting further polymerization. Likewise, a "deactivated" catalyst will not promote polymerization.

In accordance with the purpose(s) of this invention, as embodied and broadly described herein, this invention, in one aspect, relates to a process of deactivating a polycarbonate, comprising admixing a polycarbonate containing an active alkali metal catalyst residue with an effective amount of a carboxylic acid at a temperature and time sufficient to deactivate the alkali metal catalyst and form a polycarbonate having a deactivated metal catalyst.

The applicants have discovered a process by which particular carboxylic acids can be used to deactivate a basic catalyst residue contained in a polycarbonate. In one embodiment, the basic catalyst is deactivated 100%. Especially surprising is the fact that the acids used in the present process are relatively weak, nonvolatile carboxylic acids, instead of the strong acids previously used for obtaining catalyst deactivation.

The invention further relates to a process of deactivating polycarbonates comprising reacting a polycarbonate containing active alkali metal catalyst residue with an effective amount of a relatively weak nonvolatile carboxylic acid at a temperature and time sufficient to form a deactivated polycarbonate.

The process of the present invention has the unexpected benefit of not requiring removal of the deactivated catalyst from the polymer. This is particularly surprising in light of U.S. Defensive Publication T873,016 in which carboxylic acids are listed as one of several types of acids which can be used to form alkali metal salts in a deactivation process. The Defensive Publication teaches that the "salts" formed are colored impurities which must be removed from the polycarbonate in order to provide a polycarbonate product having improved thermal stability and good color. However, the applicants have found the retention of the metal salts formed by the carboxylic acids of the present process has no significant affect on color or thermal stability.

An additional unexpected benefit of the present process is that it can be conducted under molten conditions. This allows for very convenient deactivation immediately after melt polymerization. This is surprising in view of U.S. Defensive Publication T873,016 which teaches against acid deactivation under molten conditions due to the presence of colored decomposed acid impurities.

In the present invention, a polycarbonate is treated with the present deactivation process after the polymerization process has proceeded to the desired molecular weight. Since the alkali metal catalyst is completely deactivated by the present process, no further buildup of molecular weight will occur under high vacuum, as occurs in many of the known deactivation methods.

The process of the present invention comprises treating a polycarbonate containing active alkali metal catalyst residues with an effective amount of a relatively weak nonvolatile carboxylic acid, such as those described below.

This process is effective in deactivating alkali metal condensation catalysts known in the polycarbonate art. Suitable alkali metal catalysts include, for instance, oxides, hydrides and hydroxides of alkali metals, free alkali metals, butyl lithium, phenyl lithium, sodium aluminate, and alkali metal alkoxides such as sodium methoxide. The present process is preferably used to deactivate sodium methoxide, lithium methoxide, sodium metal and lithium metal.

The process of the present invention can be used to deactivate polycarbonates which are formed by polymerization techniques employing basic alkali metal catalysts. The polycarbonates currently made using these catalysts are aliphatic. However, the structure of the polycarbonate is not critical, as long as it contains active basic catalyst residue. The present process has been found to be especially useful in deactivating alkali metal residues contained in poly(2,2,4,4-tetramethyl-1,3-cyclobutylene carbonate).

The polycarbonate to be treated can be made by any process wherein alkali metal catalysts are employed. The polycarbonate can be made by melt polymerization or solid-state polymerization. U.S. Pat. No. 3,313,777 discloses poly(2,2,4,4-tetramethyl- 1,3-cyclobutylene carbonate) prepared by condensation of 2,2,4,4-tetramethyl-1,3-cyclobutanediol and carbonic acid in the presence of alkali metal catalysts.

Applicants' provisional application (serial No. 60/034,992), incorporated herein in its entirety by this reference, discloses the preparation of poly(2,2,4,4-tetramethyl-1,3-cyclobutylene carbonate) by the self-condensation melt polymerization reaction of carbonic acid 3-methoxycarbonyloxy-2,2,4,4-tetramethyl-cyclobutyl ester methyl ester (the bis(methyl carbonate) of 2,2,4,4-tetramethyl-1,3-cyclobutanediol) in the presence of a catalyst selected from the group consisting of alkali metals, alkoxides of alkali metals, carboxylates of alkali metals, and mixtures thereof under polycondensation conditions of temperature and pressure.

Applicants' provisional application (serial No. 60/034,164), incorporated herein in its entirety by this reference, discloses a two-staged process for making poly(2,2,4,4-tetramethyl-1,3-cyclobutylene carbonate). The first polymerization stage comprises heating a mixture containing the diol, dimethyl carbonate, and an effective amount of a basic catalyst for a time sufficient to react a sufficient number of hydroxyl groups (at least about 75%), thereby forming an intermediate including methyl carbonate-terminated oligomers. The second stage includes reacting the intermediate under polycondensation conditions of pressure and temperature no greater than 300° C. for a time sufficient to form polycarbonate.

Suitable carboxylic acids for use in the present process are those acids having relatively low ionization constants. In one embodiment, the ionization constant is from $1.0 \times 10^{-3}$ to $1.0 \times 10^{-8}$, preferably from $1.0 \times 10^{-4}$ to $1.0\ 10^{-8}$. The use of strong acids would require an additional step of extraction or washing to remove the highly colored salt impurity.

Suitable carboxylic acids for use in the present process are also nonvolatile. Acids are considered nonvolatile for present purposes if they have vapor pressures low enough that they do not vaporize from the polymerization mixture under present processing conditions such as distillation, sublimation, and the like. Volatile acids reverse or hinder the deactivation reaction by vaporization of the acid Suitable acids for use in the present processes must also be stable under the conditions of the present processes. If the acid is unstable and decomposes, the decomposed acid can discolor the polymer. Moreover, the if the acid decomposes, the basic catalyst will not be deactivated. The acid used should be stable enough so that it is not removed from the mixture by decomposition. Decomposition of the acid during the high temperature deactivation step could also lead to unwanted addition of color to the product.

Accordingly, an acid meeting the above criterion would be suitable for the present process. Nonvolatile carboxylic acids are preferred. Carboxylic acids used may be aliphatic, cycloaliphatic, or aromatic. Straight chain mono- and di-carboxylic acids are more preferred acids due to less chance of causing polymer branching. The most preferred acids are trans-1,4-cyclohexanedicarboxylic acid, 4,4'-oxydibenzoic acid, sebacic acid, trimellitic acid, and terephthalic acid. In the process of the present invention, an active polycarbonate is treated with an effective amount of acid. An "effective amount" is herein defined as an amount sufficient to deactivate all basic alkali metal catalyst residues so that they no longer catalyze polymer formation or polymer buildup reactions.

The concentrations of acid used in the process of the present invention are expressed herein as equivalent percents, wherein the addition of 100 equivalent percent acid is the theoretical amount of acid to neutralize the amount of basic catalyst added to the polymerization reaction mixture. The equivalent percent is based upon the number of protic hydrogens contained in the acid molecules. The concentration of active basic catalyst is necessarily theoretical due to the fact that some of the basic catalyst added to the polymerization mixture may be in a reacted form or as an unionized free metal and therefore unavailable for reaction with the deactivating acid.

The amount of nonvolatile carboxylic acid added to the polymer may be varied within wide limits. As little as about 50 equivalent percent, to as much as about 500 equivalent percent is an effective amount. More than about 500 equivalent percent of the theoretical amount required for catalyst neutralization should generally be avoided, not only for economic reasons, but because larger amounts may affect polymer properties. A preferable concentration of carboxylic acid to deactivate the polycarbonate is about 75 to 200 equivalent percent, more preferably about 75 to 125 equivalent percent.

A benefit of the present process is that there is no need to remove the deactivated catalyst from the polycarbonate.

The invention further relates to a process of deactivating a polycarbonate, comprising:
 (a) admixing
  i) a solid state polycarbonate comprising an active alkali metal catalyst; and
  ii) a carboxylic acid; and
 (b) heating the admixture of step (a) at a temperature sufficient to melt the admixture and deactivate the alkali metal catalyst to produce a polycarbonate having a deactivated alkali metal catalyst.

The process of the present invention may be conducted by mixing the deactivator with a molten polycarbonate and reacting the mixture under further molten conditions. The present process may alternatively be conducted after mixing the deactivator with a solid polymer and subsequently heating the mixture to attain molten reaction conditions. The process of the present invention is conducted at high temperatures from the melting point of the polymer to about 300° C. It is critical that the carboxylic acid not be lost by volatilization or decomposition during the high temperature deactivation. The process of the present invention is conducted at a pressure of from ambient atmospheric pressure to about 1.0 torr, preferably up to about 2.0 torr. The present deactivation process is preferably conducted under molten conditions using a polycarbonate which was formed by melt polymerization.

The reaction time of the process of the present invention can vary depending upon the amount of activated catalyst present in the polycarbonate and the concentration of the carboxylic used to deactivate the catalyst. In one embodiment, the reaction time is from 0.5 to 60 minutes, preferably from 0.5 to 5 minutes.

The invention further relates to a process of making a polycarbonate, comprising:
 (a) polymerizing a first polycarbonate in the presence of an alkali metal catalyst to produce an activated polycarbonate; and
 (b) admixing the activated polycarbonate with an effective amount of a carboxylic acid at a temperature and time sufficient to deactivate the alkali metal catalyst and form the polycarbonate having a deactivated alkali metal catalyst.

The invention further relates to a process of making polycarbonate comprising the steps of:
 (a) polymerizing polycarbonate in the presence of an alkali metal catalyst, and
 (b) reacting said polycarbonate with an effective amount of a relatively weak non-volatile carboxylic acid at a temperature and time sufficient to form deactivated polycarbonate.

The present process is effectively combined with polymerization to provide a thermally stable polycarbonate having good color. This combined process would include the step of polymerizing a polycarbonate in the presence of an alkali metal catalyst and reacting the polycarbonate with an effective amount of a nonvolatile carboxylic acid having a relatively low ionization constant at a temperature and time sufficient to form a polycarbonate.

Subsequent to deactivation, the process of the present invention preferably comprises an additional step of subjecting the polycarbonate to a vacuum sufficient to further increase the thermal stability of the polycarbonate. Low pressure further increases the thermal stability of the polycarbonate, in addition to the increase in thermal stability gained by catalyst deactivation.

When the polycarbonate is prepared by a melt polymerization process, a preferred method would be to release the vacuum on the polymerization melt with an inert gas, and add the desired amount of nonvolatile carboxylic acid into the polymer melt. Afterwards, the mixture should be agitated under an inert atmosphere for a time sufficient to mix the nonvolatile carboxylic acid into the polymer melt. After deactivation of the catalyst residues, the thermal stability is further improved by briefly applying vacuum to the molten mixture.

In applying the process of the present invention to polycarbonates prepared by solid state polymerization or solution-prepared methods of polymerization, the nonvolatile carboxylic acid may be physically mixed with pellets or granules of the polycarbonate. The mixture of polycarbonate and carboxylic acid may then be extruded in order to deactivate the catalyst residues. Instead of conducting the additional low pressure step for further increasing the thermal stability, the extrusion may optionally be carried out in an extruder having high vacuum capabilities.

The invention further relates to a polycarbonate comprising an alkali metal carboxylate.

The invention also relates to the products produced by the processes described above.

The deactivation process of the present invention provides a polycarbonate having improved thermal stability. The improvement in thermal stability is shown by comparison of the degradation rate constants (DRC) of the polycarbonate before and after the process of the present invention. A reduction in DRC is an improvement in thermal stability. A detailed method of measuring DRC is shown in the Examples below.

The invention further relates to a polycarbonate comprising a deactivated alkali metal catalyst, wherein the deactivated metal catalyst is a salt produced by the reaction between a carboxylic acid and an alkali metal catalyst. In one embodiment, the polycarbonate is poly(2,2,4,4-tetramethyl-1,3-cyclobutylene carbonate).

The clarity and color of the polycarbonate product of the present process do not significantly change by the deactivation process of the present invention. Furthermore, the clarity and color do not change due to the presence of the deactivated alkali metal catalyst, which is an alkali metal carboxylate. The reaction between carboxylic acid and the basic alkali metal catalyst results in the formation of the alkali metal carboxylate, which is the deactivated catalyst. The structure of the alkali metal carboxylate is $A^-M^+$, where $M^+$ is preferably a lithium or sodium cation, and $A^-$ is the conjugate base of any carboxylic acid used in the present invention to deactivate the alkali metal catalyst. Preferably, the product of the present invention will be a clear polycarbonate, more preferably being clear and having little or no color. The inherent viscosity and other mechanical properties of the polycarbonate product of the present process are not significantly altered by the present process.

In the preferred embodiment of the present invention the product is clear, colorless poly(2,2,4,4-tetramethyl-1,3-cyclobutylene carbonate) having a degradation rate constant (DRC) of less than about $10 \times 10^{-5}$.

EXAMPLES

The following examples are put forth so as to provide those of ordinary skill in the art with a complete disclosure and description of how the compounds claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at room temperature and pressure is at or near atmospheric.

The following test methods were used in the Examples:
1) Inherent viscosity (IV) was determined at 25° C. using 0.25 grams polymer dissolved, without heating, in a 60/40 w/w mixture of phenol/1,1,2,2-tetrachloroethane at a concentration of 0.005 g/mL; and
2) Melt thermal stability was determined by a Dynamic Analyzer RDAII mechanical spectrometer rheometer manufactured by Rheometrics, Inc. (Piscataway, N.J.), using 25 mm flat parallel plate fixtures, nitrogen purge gas, 10% strain, 1 radian/sec oscillation frequency, 1 mm sample gap (sample thickness), 275° C. melt temperature.

To test thermal stability, sample polymer pellets were dried overnight under full vacuum at 120° C. The rheometer was preheated to 275° C. test temperature. The "zero gap" between the parallel plates was set, and pellets loaded directly onto the lower plate and allowed to melt. The upper plate was then lowered to give a 1-mm sample gap. Excess melt was thereafter trimmed away. The temperature was allowed to reequilibrate and the instrument, which was previously programmed for a sweep test at constant frequency rate and temperature, was started.

Thirty readings of melt viscosity were taken at 1 minute intervals. The collected data (elastic modulus, G'; loss modulus, G"; frequency, w temperature, ° C.; and time, t) were reduced by an RS1 software program (BBN Corp.) to plot melt viscosity versus time and calculate a degradation rate constant (DRC) using the equation $1/(N)^{(a)} = 1/(N_o)^{(a)} + (DRC)t$, where $N_o$=complex viscosity at zero heating time ($t_o$) ($t_o$ is when the sample is first placed on the preheated plate); N=complex viscosity at time t>0; and a=0.294. Complex viscosity is calculated as $(N) = ([(G')^2 + (G'')^2]^{1/2})/w$. A more detailed description of this test method is disclosed in *Journal Of Applied Polymer Science*, Vol. 42, 845–850 (1991).

EXAMPLE 1

This example illustrates the use of sebacic acid as the deactivating carboxylic acid at 125 molar equivalent percent of the basic catalyst residues of poly(2,2,4,4-tetramethyl-1,3-cyclobutylene carbonate) prepared from the bis(methyl carbonate) derivative of 2,2,4,4-tetramethyl-1,3-cyclobutanediol.

A 500-mL three-necked flask was equipped with a 304 SS stirrer, a glass stopper for one of the sidenecks, a special glass head for the center neck through which a metal stirrer was inserted and argon gas was introduced to the polymerization apparatus, and a 12-inch vigreux column which was attached to the other sideneck of the flask, to dry ice traps, and to a source of vacuum. Into the flask were placed 182.00 grams (0.70 mole) of the bis(methyl carbonate) derivative of 2,2,4,4-tetramethyl-1,3-cyclobutanediol (approximately 49% trans), and 0.0704 grams of sodium formate (approximately 200 ppm Na based on a theoretical polymer yield of 119 g). The flask with its contents was evacuated to <0.5 torr and the vacuum was released to argon, with the evacuation/vacuum procedure being repeated two times. Then, under an argon atmosphere, the flask with its contents was partially immersed in a Belmont metal bath maintained at 200° C. and stirred at 200° C. for 1 hour plus 2 hours at 220° C. plus 1 hour at 240° C.

At this point, the amount of distillate was 43.73 g, and the polymer was colorless and had a very low melt viscosity. The vigreux column was then removed from the flask so that the outlet from the polymerization flask was attached directly by means of a glass take-off tube to a trap which was cooled with dry ice. The metal bath temperature was increased to 265° C., held for 15 minutes, and then vacuum was applied. Over a period of 15 minutes, the pressure in the polymerization flask was reduced to about 2.5 torr where the polymerate was continuously stirred for 25 minutes to obtain a high melt viscosity, colorless polycarbonate. The vacuum was released to argon, and a 6.60 grams sample containing "active" catalyst residue was removed.

Sebacic acid, 0.1306 grams (125 molar equivalent percent of the Na catalyst charged initially), was added to the active polymer. The mixture was stirred for 10 minutes under argon at 275° C. and the metal bath temperature was increased to 285° C. as vacuum (1.2 torr) was applied to the mixture for 5 minutes. The mixture was stirred at 285° C. at 1.2 torr for an additional 10 minutes, whereafter the vacuum was released to argon. The flask was cooled and the polymer was removed from the flask.

The final product contained deactivated catalyst residues. Both the active and polycarbonate samples were essentially colorless, having IV's of 0.63 and 0.62 dL/g, respectively. This indicates that the present process of deactivating the catalyst residues causes no color change and completely deactivates the catalyst, since no significant change in IV occurred during the second vacuum application. The degradation rate constants (DRC) for the active and polycarbonates, as determined by the melt stability test at 275° C., were $47 \times 10^{-5}$ and $3.7 \times 10^{-5}$ respectively. This illustrates the excellent improvement in polymer thermal stability provided by the deactivation process of the present invention. These and other comparative data are shown below in Table 1.

EXAMPLE 1A—(CONTROL)

This example illustrates the undesirable color obtained when p-toluene sulfonic acid, a strong deactivator acid disclosed in the literature, is used in the process of this invention.

Example 1 was repeated except 0.2945 grams p-toluene sulfonic acid (150 equivalent percent of the Na catalyst residues) was used as the catalyst deactivator, instead of the 0.1306 grams of sebacic acid. The active sample was colorless and had an IV of 0.40 dL/g; the deactivated sample was light yellow and had an IV of 0.40 dL/g. The polycarbonate sample became undesirably light yellow-colored very soon after the addition of the p-toluene sulfonic acid.

This example illustrates the importance in using a nonvolatile acid having an ionization constant within the scope of the present invention.

EXAMPLES 2–10

Examples 2–10 indicate the affect of using different concentrations of sebacic acid and 4,4'-oxydibenzoic acid as catalyst deactivators in the process of the present invention. The Na catalyst and catalyst concentration, in these cases, were the same as in Example 1. The results are shown in Table 1.

Examples 1 through 6 illustrates that a concentration of about 50 to 500 equivalent percent deactivating acid is effective for the present process. Example 2 illustrates that 25 equivalent percent does not totally deactivate the Na catalyst, as was evidenced by an increase in polymer IV upon subjection to the final vacuum.

EXAMPLES 11–14

These examples illustrate the utility of trans-1,4-cyclohexanedicarboxylic acid as the catalyst deactivator in the new process of the present invention. For these examples, the amount of catalyst residues is relatively low (approximately 50 ppm Na, based on a theoretical polymer yield) compared to Examples 1 through 10 above (approximately 200 ppm Na, based on a theoretical polymer yield).

The results are shown in Table 1. As can be seen from the result shown in Table 1, trans-1,4-cyclohexanedicarboxylic acid is an effective acid for this process. These examples, in conjunction with Examples 1–10, also illustrate that the present process is useful in deactivating polycarbonates having a broad concentration range of catalyst residue.

EXAMPLE 15

This example illustrates the utility of the process of the present invention when the polycarbonate of 2,2,4,4-tetramethyl-1,3-cyclobutanediol is prepared by the reaction of 2,2,4,4-tetramethyl-1,3-cyclobutanediol with dimethyl carbonate, rather than by polymerizing a purified sample of the bis(methyl carbonate) derivative of the glycol.

A 500-mL, three-necked flask was equipped with a 304 SS stirrer, a glass stopper for one of the sidenecks, a special glass head for the center neck through which the metal stirrer was inserted and argon gas was introduced to the polymerization apparatus, and a 12-in vigreux column which was attached to the other sideneck of the flask and to a distillation head. The distillation head was attached to dry ice traps and a source of vacuum. Into the flask were placed 182 grams (0.30 mol) of 2,2,4,4-tetramethyl-1,3-cyclobutanediol (approximately 49% trans) and 162 grams (1.9 mol) of dimethyl carbonate.

The system was flushed with argon and solution was obtained. A very slow flow of argon was maintained throughout the polymerization until the application of vacuum. The flask was partly immersed in the Belmont metal bath and 15 mL of dimethyl carbonate were distilled over to dry the system.

The flask was cooled slightly, 3 mL of a 0.1 N solution of NaOCH$_3$ in methanol was added as a catalyst, and the flask was again heated to reflux. Over a period of 3 hours, 91 ml were distilled over at a head temperature of from 65° to 90° C. and partial takeoff. The excess volatiles were then distilled over by further immersing the flask into the metal bath. The flask was then stirred with very slow argon flow at 200°, 220° and 240° C. for one hour (each temperature) and 25 ml of distillate was collected.

The vigreux column was then removed from the system. The distillation head was connected directly to one of the sidenecks of the flask. The temperature of the metal bath was increased to 275° C. After 10 minutes, vacuum was applied to the flask and the pressure was reduced to full vacuum (1.2 torr) for 20 minutes. The polymer was essentially colorless and had a moderately high melt viscosity. The vacuum was then released to argon.

A 4.71 grams "active" sample was removed, and 0.379 grams (125 equivalent molar % of the Na catalyst charged originally to the polymerization flask) of sebacic acid was added and mixed into the polymer melt at 275° C. for 10 minutes. A vacuum of 1.2 torr was applied to the mixture during 5 minutes; the mixture was stirred at 275° C. under 1.2 torr for an additional 10 minutes; the vacuum was released to argon; the flask was cooled by removing it from the metal bath and the polymer was removed from the flask.

The active and deactivated samples were essentially colorless and had IV's of 0.51 dL/g and 0.50 dL/g, respectively, which indicates that the catalyst deactivation process of the present invention causes no color and completely deactivates the catalyst, when the poly(2,2,4,4-tetramethyl-1,3-cyclobutylene carbonate) is polymerized from the reaction of 2,2,4,4-tetramethyl-1,3-cyclobutanediol and dimethyl carbonate.

The degradation rate constants (DRC) for the active and deactivated samples, as determined by the melt thermal stability test at 275° C. were, respectively, $31 \times 10^{-5}$ and $9.3 \times 10^{-5}$, which illustrates the excellent thermal stability of the "deactivated" polycarbonate sample. These and other comparative data are shown below in Table 1.

EXAMPLE 16

Example 15 was repeated except 0.0852 grams (100 equivalent percent of the theoretical amount required to deactivate the catalyst residues) of stearic acid was added as the catalyst deactivator. The active sample contained no color, had an IV of 0.40 dL/g, and a DRC at 275° C. equal to $39 \times 10^{-5}$. The deactivated sample contained some yellow color, had an IV of 0.43 dL/g, and a DRC at 275° C. of $9 \times 10^{-5}$. The data is shown below in Table 1.

TABLE 1

Effect of Non-Volatile Carboxylic Acids as Na Catalyst Deactivators in Poly(2,2,4,4-tetramethyl-1,3-cyclobutylene carbonate)

| | Acid Deactivator | | Active Na Catalyst | | | Deactivated Na Catalyst | | |
|---|---|---|---|---|---|---|---|---|
| Ex | Acid | Eq % | IV | DRC ($\times 10^{-5}$) | Color | IV | DRC ($\times 10^{-5}$) | Color |
| 1A | p-Toluene-sulfonic | 150 | .40 | *** | None | .40 | *** | Light Yellow |
| 1 | Sebacic | 125 | .63 | 47 | None | .62 | 4 | None |
| 2 | Sebacic | 25 | .51 | 72 | None | .65 | 42 | None |
| 3 | Sebacic | 50 | .55 | 40 | None | .56 | 22 | None |
| 4 | Sebacic | 75 | .45 | 77 | None | .44 | 6 | None |
| 5 | Sebacic | 75 | .64 | 38 | None | .62 | 10 | None |
| 6 | Sebacic | 125 | .73 | 21 | None | .70 | 8 | None |
| 7 | Sebacic | 200 | .53 | 61 | None | .53 | 13 | None |
| 8 | Sebacic | 500 | .50 | 61 | None | .51 | 22 | None |
| 9 | 4,4'-Oxy-dibenzoic | 125 | .61 | 54 | None | .60 | 9 | None |
| 10 | 4,4'-Oxy-dibenzoic | 200 | .35 | 169 | None | .36 | 9 | None |
| 11 | trans-1,4-CHDA | 75 | .57 | 31 | None | .56 | 20 | None |
| 12 | trans-1,4-CHDA | 75 | .75 | 24 | None | .73 | 15 | None |
| 13 | trans-1,4-CHDA | 125 | .57 | 23 | None | .57 | 17 | None |
| 14 | trans-1,4-CHDA | 200 | .65 | 23 | None | .58 | 12 | None |
| 15 | Sebacic | 125 | .51 | 31 | None | .50 | 9 | None |
| 16 | Stearic | 100 | .40 | 39 | None | .43 | 9 | Light Amber |

DRC = Degradation rate constant determined by the melt thermal stability test at 275° C.
trans-1,4-CHDA = trans-1,4-cyclohexanedicarboxylic acid.
Eq % = Equivalent percent of acid based on the theoretical amount of the Na catalyst present.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A process of in a deactivation step deactivating a poly(2,2,4,4-tetramethyl-1,3-cyclobutylene carbonate) comprising admixing a poly(2,2,4,4-tetramethyl-1,3-cyclobutylene carbonate) containing an active metal catalyst residue with an effective amount of a carboxylic acid at a temperature and time sufficient to deactivate the alkali metal catalyst and form a poly(2,2,4,4-tetramethyl-1,3-cyclobutylene carbonate) having a deactivated metal catalyst wherein the carboxylic acid is not removed after the deactivation step.

2. The process of claim 1, wherein the poly(2,2,4,4-tetramethyl-1,3-cyclobutylene carbonate) is aliphatic.

3. The process of claim 1, wherein the alkali metal catalyst comprises an alkali metal oxide, an alkali metal hydride, an alkali metal hydroxide, a free alkali metal, butyl lithium, phenyl lithium, sodium aluminate, an alkali metal alkoxide, or a combination thereof.

4. The process of claim 1, wherein the alkali metal catalyst comprises sodium methoxide, lithium methoxide, sodium metal, or lithium metal.

5. The process of claim 1, wherein the carboxylic acid is aliphatic, cycloaliphatic, or aromatic.

6. The process of claim 1, wherein the carboxylic acid is nonvolatile.

7. The process of claim 1, wherein the carboxylic acid comprises a monocarboxylic acid, a dicarboxylic acid, or a combination thereof.

8. The process of claim 1, wherein the carboxylic acid comprises sebacic acid, 4,4'-oxydibenzoic acid, trans-1,4-cyclohexanedicarboxylic acid, trimellitic acid, terephthalic acid or a combination thereof.

9. The process of claim 1, wherein the amount of the carboxylic acid is from about 50 to 500 equivalent percent.

10. The process of claim 1, wherein the amount of the carboxylic acid is from about 75 to 200 equivalent percent.

11. The process of claim 1, wherein the amount of the carboxylic acid is from about 75 to 125 equivalent percent.

12. The process of claim 1, wherein during the deactivation step, the pressure is from atmospheric pressure to 1 torr.

13. The process of claim 1, wherein during the deactivation step, the pressure is from atmospheric pressure to 2 torr.

14. The process of claim 1, wherein during the deactivation step, the temperature is less than or equal to 300° C.

15. The process of claim 1, further comprising after the deactivation step, applying a vacuum to the poly(2,2,4,4-tetramethyl-1,3-cyclobutylene carbonate).

16. The process of claim 1, wherein the poly(2,2,4,4-tetramethyl-1,3-cyclobutylene carbonate) is molten poly(2,2,4,4-tetramethyl-1,3-cyclobutylene carbonate).

17. The process of claim 1, wherein the poly(2,2,4,4-tetramethyl-1,3-cyclobutylene carbonate) is colorless.

18. The composition made by the process of claim 1.

19. A process of in a deactivation step deactivating a poly(2,2,4,4-tetramethyl-1,3-cyclobutylene carbonate) comprising the steps of:
  (a) admixing
    (i) a solid state poly(2,2,4,4-tetramethyl-1,3-cyclobutylene carbonate) having an active alkali metal catalyst; and
    (ii) a carboxylic acid; and
  (b) heating the admixture of step (a) at a temperature sufficient to melt the admixture and deactivate the alkali metal catalyst to produce a poly(2,2,4,4-tetramethyl-1,3-cyclobutylene carbonate) having a deactivated metal catalyst wherein the carboxylic acid is not removed after the deactivation step.

20. The process of claim 19, wherein the solid state poly(2,2,4,4-tetramethyl-1,3-cyclobutylene carbonate) comprises a pellet or granule.

21. The composition made by the process of claim 19.

22. A process of making a poly(2,2,4,4-tetramethyl-1,3-cyclobutylene carbonate) comprising:

(a) polymerizing a poly(2,2,4,4-tetramethyl-1,3-cyclobutylene carbonate) in the presence of an alkali metal catalyst to produce an activated poly(2,2,4,4-tetramethyl-1,3-cyclobutylene carbonate); and (b) admixing the activated poly(2,2,4,4-tetramethyl-1,3-cyclobutylene carbonate) with an effective amount of a carboxylic acid at a temperature and time sufficient to deactivate the alkali metal catalyst and form the polycarbonate having a deactivated alkali metal catalyst wherein the carboxylic acid is not removed after deactivation.

23. The composition made by the process of claim 22.

24. A poly(2,2,4,4-tetramethyl-1,3-cyclobutylene carbonate) composition comprising a poly(2,2,4,4-tetramethyl-1,3-cyclobutylene carbonate) and an alkali metal carboxylate.

25. The poly(2,2,4,4-tetramethyl-1,3-cyclobutylene carbonate) composition of claim 24, wherein the alkali metal is lithium or sodium.

26. The poly(2,2,4,4-tetramethyl-1,3-cyclobutylene carbonate) composition of claim 25, wherein the poly(2,2,4,4-tetramethyl-1,3-cyclobutylene carbonate) has a degradation rate constant less than $10 \times 10^{-5}$.

27. A process of deactivating a poly(2,2,4,4-tetramethyl-1,3-cyclobutylene carbonate) comprising reacting a poly(2,2,4,4-tetramethyl-1,3-cyclobutylene carbonate) containing an active alkali metal catalyst residue with an effective amount of a relatively weak nonvolatile carboxylic acid at a temperature and time sufficient to form a deactivated poly (2,2,4,4-tetramethyl-1,3-cyclobutylene carbonate) wherein the carboxylic acid is not removed after deactivation.

28. A process of making a poly(2,2,4,4-tetramethyl-1,3-cyclobutylene carbonate) comprising the steps of:

(a) polymerizing a poly(2,2,4,4-tetramethyl-1,3-cyclobutylene carbonate) in the presence of an alkali metal catalyst; and (b) reacting said poly(2,2,4,4-tetramethyl-1,3-cyclobutylene carbonate) with an effective amount of a relatively weak non-volatile carboxylic acid at a temperature and time sufficient to form deactivated poly (2,2,4,4-tetramethyl-1,3-cyclobutylene carbonate) wherein the carboxylic acid is not removed after deactivation.

29. A poly(2,2,4,4-tetramethyl-1,3-cyclobutylene carbonate) composition comprising a poly(2,2,4,4-tetramethyl-1,3-cyclobutylene carbonate) and a deactivated alkali metal catalyst, wherein the deactivated metal catalyst is a salt produced by the reaction between a carboxylic acid and an alkali metal catalyst.

* * * * *